(12) United States Patent
Harigai et al.

(10) Patent No.: US 11,508,029 B2
(45) Date of Patent: Nov. 22, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Jungo Harigai, Kanagawa (JP); Yoshitaka Kuwada, Kanagawa (JP); Hirotake Sasaki, Kanagawa (JP); Takuma Ishihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/317,981

(22) Filed: May 12, 2021

(65) Prior Publication Data

US 2022/0130009 A1 Apr. 28, 2022

(30) Foreign Application Priority Data

Oct. 22, 2020 (JP) .............................. JP2020-177539

(51) Int. Cl.
*G06T 3/00* (2006.01)
*G06T 7/33* (2017.01)
*G06T 3/40* (2006.01)
*G06T 7/11* (2017.01)

(52) U.S. Cl.
CPC .............. *G06T 3/0068* (2013.01); *G06T 3/40* (2013.01); *G06T 7/11* (2017.01); *G06T 7/33* (2017.01); *G06T 2200/24* (2013.01)

(58) Field of Classification Search
CPC ..... G06T 7/33; G06T 2200/24; G06T 3/0068; G06T 7/11; G06T 3/40
See application file for complete search history.

(56) References Cited

U.S. PATENT DOCUMENTS

| | | | | |
|---|---|---|---|---|
| 5,781,184 | A | * 7/1998 | Wasserman | ............ H04N 5/262 348/441 |
| 5,923,791 | A | * 7/1999 | Hanna | .................... H04N 5/272 382/199 |
| 2014/0063241 | A1 | * 3/2014 | Li | .............................. G06T 7/75 348/143 |
| 2014/0321702 | A1 | * 10/2014 | Schmalstieg | ............. G06T 7/20 382/103 |
| 2016/0212342 | A1 | * 7/2016 | Semenov | ............... G06V 10/44 |
| 2017/0206661 | A1 | 7/2017 | Sasaki | |

(Continued)

FOREIGN PATENT DOCUMENTS

JP H06-274650 A 9/1994
JP H08-287225 A 11/1996
(Continued)

*Primary Examiner* — Phi Hoang
(74) *Attorney, Agent, or Firm* — Oliff PLC

(57) ABSTRACT

An information processing apparatus includes: a processor configured to: set a geometrical transformation region for use in generating a geometrical transformation image into which a sample image is geometrically transformed, based on a replacement target region set in a part of an original image; generate the geometrical transformation image by geometrically transforming the sample image such that the transformed sample image has a shape of the geometrical transformation region; and replace the replacement target region using the geometrical transformation image.

16 Claims, 15 Drawing Sheets

(56) References Cited

U.S. PATENT DOCUMENTS

| | | | | |
|---|---|---|---|---|
| 2017/0220230 A1* | 8/2017 | Price | ........................ | G06T 7/215 |
| 2017/0221243 A1* | 8/2017 | Bedi | ........................ | G06T 11/60 |
| 2018/0137654 A1 | 5/2018 | Sasaki | | |
| 2018/0342104 A1* | 11/2018 | Stauder | ................. | G06T 19/006 |
| 2019/0045118 A1* | 2/2019 | Yasutomi | ........... | H04N 5/23254 |
| 2021/0350573 A1* | 11/2021 | Kalra | ....................... | G06T 19/20 |

FOREIGN PATENT DOCUMENTS

| | | |
|---|---|---|
| JP | 2017-126304 A | 7/2017 |
| JP | 2018-081430 A | 5/2018 |

\* cited by examiner

FIG. 19
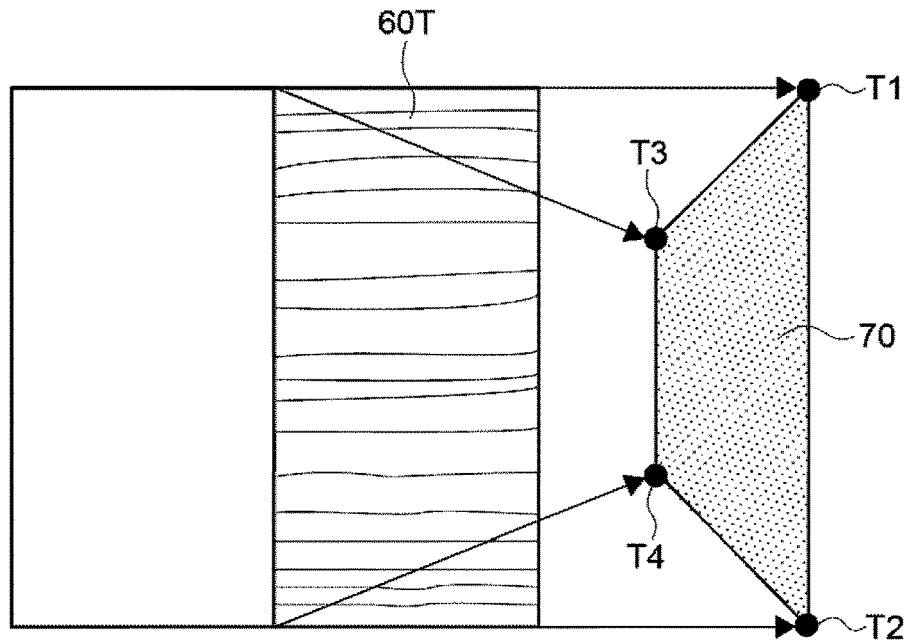
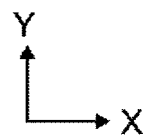
FIG. 20
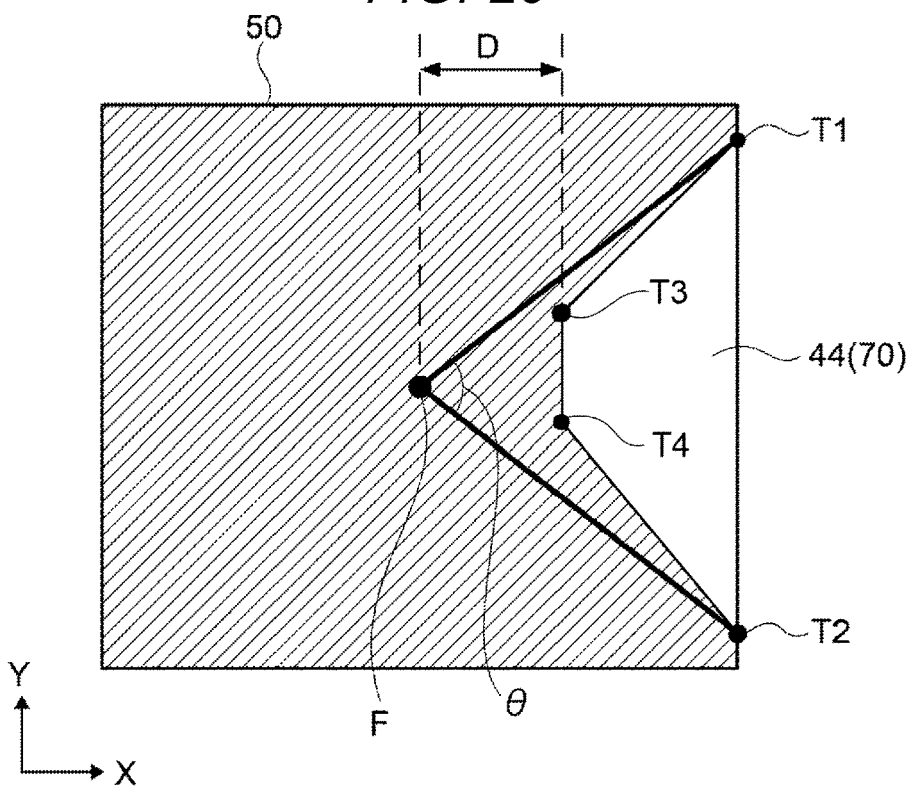
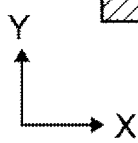

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-177539 filed Oct. 22, 2020.

BACKGROUND

(i) Technical Field

The present disclosure relates to an information processing apparatus and a non-transitory computer readable medium.

(ii) Related Art

JP-A-6-274650 discloses an image synthesizing apparatus including a unit that receives an original image, a unit that receives a texture image, a unit that designates a paste region of the original image on which the texture image is to be pasted, a unit that designates a use region of the texture image corresponding to the paste region of the original image, and an image synthesizing unit that synthesizes the paste region of the original image with the use region of the texture image. The image synthesizing unit has a function of setting a mask having at least one window region in the paste region of the original image and a function of applying a pseudo perspective transformation to the use region of the texture image.

JP-A-8-287225 discloses an image simulating device including a storage, a deforming unit, a fitting unit, and a display. The storage stores process target data representing an original image to be processed, material data that is image data of a material which can constitute an article represented by the original image, and fitting mask data representing a fitting region that is a region occupied by an image of a changeable material in the original image. The deforming unit deforms the material data in accordance with a shape of the fitting region to generate deformed material data. The fitting unit updates the process target data in the fitting region based on the deformed material data. The display displays an image represented by the process target data updated by the fitting unit.

JP-A-2018-81430 discloses an image processing device including a region detector, an image processor, and an image synthesizing unit. The region detector detects a designation region in an original image. The image processor deforms a shape of a sample image, which is an image of a sample, in accordance with a shape of the designation region, and deforms a texture of the sample image so as to represent a depth in accordance with the designation region. The image synthesizing unit synthesizes the deformed sample image and the designation region of the original image.

SUMMARY

In some cases, a user may want to replace a part (such as a wall surface) of an original image obtained by capturing a room or the like, using a sample image (such as a wall surface having another pattern). In this case, geometrical transformation may be performed on the sample image in accordance with a replacement target region in order to avoid the user from feeling uncomfortable with an image after the replacement. However, the user is to set a geometrical transformation region to which the sample image is to be geometrically transformed.

Aspects of non-limiting embodiments of the present disclosure relate to an information processing apparatus and a non-transitory computer readable medium that can replace a part of an original image using a geometrical transformation image without a user setting a geometrical transformation region.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: set a geometrical transformation region for use in generating a geometrical transformation image into which a sample image is geometrically transformed, based on a replacement target region set in a part of an original image; generate the geometrical transformation image by geometrically transforming the sample image such that the transformed sample image has a shape of the geometrical transformation region; and replace the replacement target region using the geometrical transformation image.

BRIEF DESCRIPTION OF THE DRAWINGS

Exemplary embodiment(s) of the present disclosure will be described in detail based on the following figures, wherein:

FIG. 19 illustrates correcting of a sample image; and

FIG. 20 illustrates the correcting of the sample image.

DETAILED DESCRIPTION

Hereinafter, exemplary embodiments of the present disclosure will be described in detail with reference to the accompanying drawings.

First Exemplary Embodiment

Figure 1:
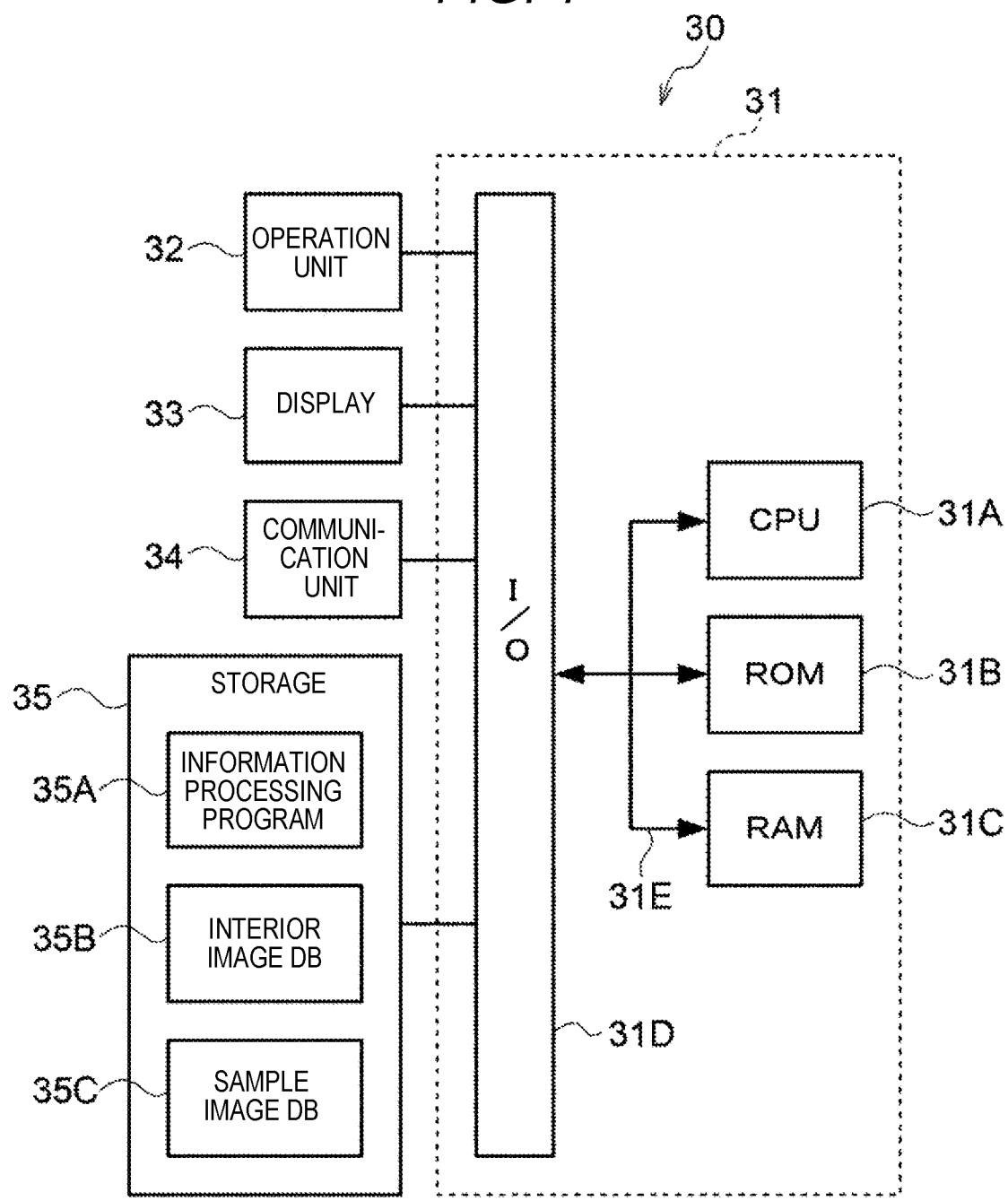
FIG. 1 illustrates a configuration of an information processing apparatus according to a first exemplary embodiment.

FIG. 1 illustrates a configuration of an information processing apparatus 30 according to the present exemplary embodiment. The information processing apparatus 30 is an apparatus including a general-purpose computer. What will be described in the present exemplary embodiment is an example in which the information processing apparatus 30 is an interior decoration simulation apparatus that generates a composite image in which an image of an interior decoration (such as a wallpaper and a flooring) that is a part of an interior image obtained by capturing an interior of a real estate property or the like is replaced with a sample image of another interior decoration and displays the composite image. Images to be processed by the information processing apparatus 30 are not limited to interior images of real estate properties, but may be any interior images in which a wall, a window or the like exists. Accordingly, an image to be processed by the information processing apparatus 30 may be an interior image of a building other than a real estate property, for example, an interior image of a user's room. Furthermore, the images to be processed by the information processing apparatus 30 are not limited to interior images, but may be images of buildings such as houses and office buildings that exist in landscape.

As illustrated in FIG. 1, the information processing apparatus 30 includes a controller 31. The controller 31 includes a central processing unit (CPU) 31A, a read only memory (ROM) 31B, a random access memory (RAM) 31C, and an input/output (I/O) interface 31D. The CPU 31A, the ROM 31B, the RAM 31C, and the I/O 31D are connected to each other over a system bus 31E. The system bus 31E includes a control bus, an address bus, and a data bus. The CPU 31A is an example of a processor.

An operation unit 32, a display 33, a communication unit 34, and a storage 35 are connected to the I/O 31D.

The operation unit 32 includes, for example, a mouse and a keyboard.

The display 33 is implemented by, for example, a liquid crystal display.

The communication unit 34 is an interface for performing data communication with an external device.

The storage 35 is implemented by a non-volatile external storage device such as a hard disk drive. The storage 35 stores an information processing program 35A, an interior image database 35B, and a sample image database 35C which will be described later. The CPU 31A loads the information processing program 35A stored in the storage 35 onto the RAM 31C and executes the information processing program 35A.

Figure 2:
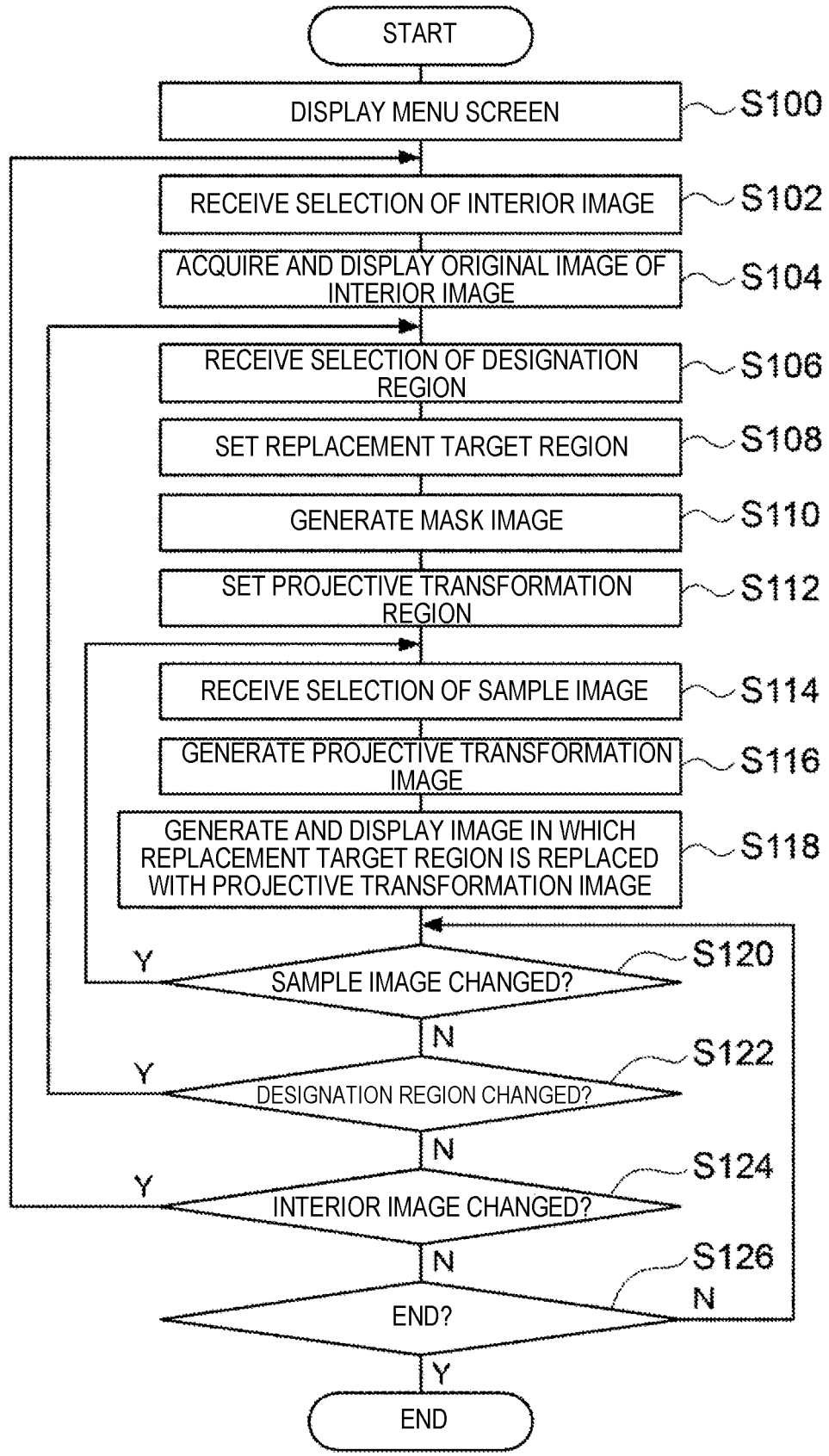
FIG. 2 is a flowchart of information processing according to the first exemplary embodiment.

Next, an operation of the information processing apparatus 30 according to the present exemplary embodiment will be described with reference to FIG. 2. By causing the CPU 31A to execute the information processing program 35A, information processing illustrated in FIG. 2 is executed. The information processing illustrated in FIG. 2 is executed when, for example, the execution of the information processing program 35A is instructed by an operation of a user.

In step S100, the CPU 31A causes the display 33 to display a menus screen (not illustrated) that allows the user to select, for example, an interior image that is a viewing target. Here, the user operates the operation unit 32 to select an interior image that the user wants to view.

In step S102, the CPU 31A receives the selection of the interior image. Upon receipt of the selection of the interior image, the CPU 31A proceeds to step S104. On the other hand, if CPU 31A does not receive the selection of the interior image, the CPU 31A waits until receiving the selection of the interior image.

In step S104, the CPU 31A obtains an original image of the selected interior image by reading the original image from the interior image database 35B of the storage 35, and causes the display 33 to display the original image. The storage 35 stores image data of original images of various interior images as the interior image database 35B in advance.

Figure 3:
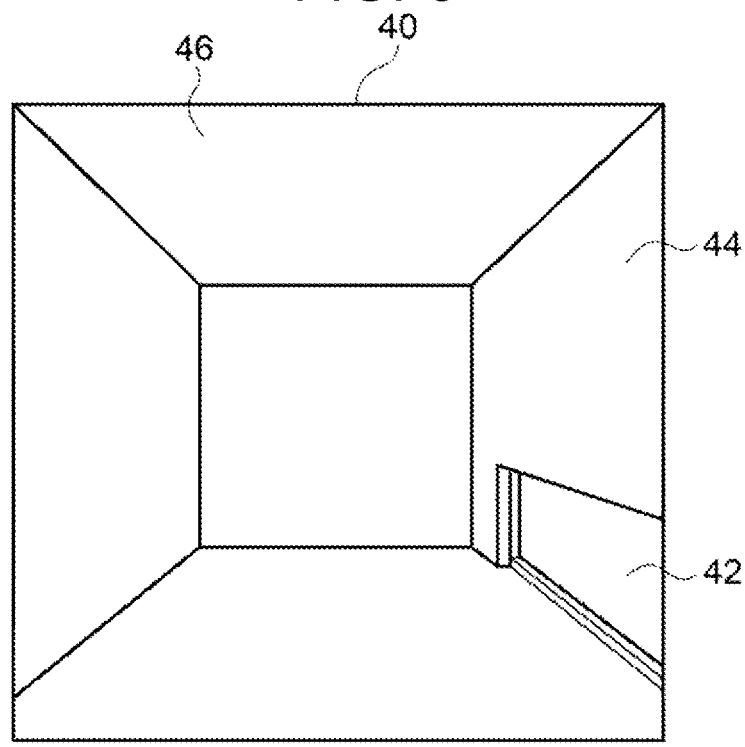
FIG. 3 illustrates an example of an original image.

FIG. 3 illustrates an example of the original image of the interior image. As illustrated in FIG. 3, an original image 40 of the interior image is an image obtained by capturing an inside of a room. Here, the user operates the operation unit 32 to designate a region in which the user wants to replace an image of an interior decoration (such as a wallpaper and a flooring) that is a part of the original image 40 with a sample image of another interior decoration. In the present exemplary embodiment, what will be described is an example in which the user designates a wall 44 excluding a window 42 on a right side. In order to designate the wall 44, the user drags the mouse of the operation unit 32 to thereby designate, for example, a region surrounding the wall 44 as a designation region.

In step S106, the CPU 31A receives the designation of the designation region. If the designation region is designated, the CPU 31A proceeds to step S108. On the other hand, if no designation region has been designated, the CPU 31A waits until the designation region is designated.

In step S108, the CPU 31A sets a replacement target region based on the designation region. Specifically, the CPU 31A extracts a region of the wall 44 from the designation region using a known image processing technique, and set the replacement target region. Thus, the region of the wall 44, which is a part of the original image 40, is set as the replacement target region. Hereinafter, the wall 44 may be referred to as the replacement target region 44. As the known image processing technique, for example, a technique disclosed in JP-A-2017-126304 may be used. It is noted that the known image processing techniques are not limited to the technique disclosed in JP-A-2017-126304.

Figure 4:
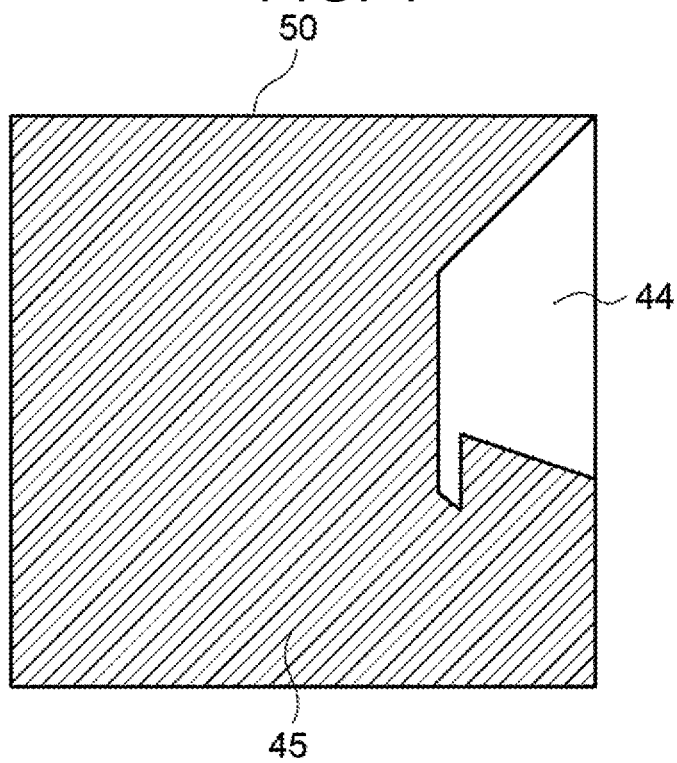
FIG. 4 illustrates an example of a mask image.

In step S110, the CPU 31A generates a mask image based on the replacement target region set in step S108. Here, the mask image is a binary image which has the same size as the original image 40. In the binary image, the replacement target region and a region other than the replacement target region in the original image are represented by binary values. FIG. 4 illustrates an example of the mask image. As illustrated in FIG. 4, the mask image 50 is a binary image in which a pixel value of each pixel in the replacement target region 44 is "1", and a pixel value of each pixel in a region 45 other than the replacement target region 44 is "0".

Figure 5:
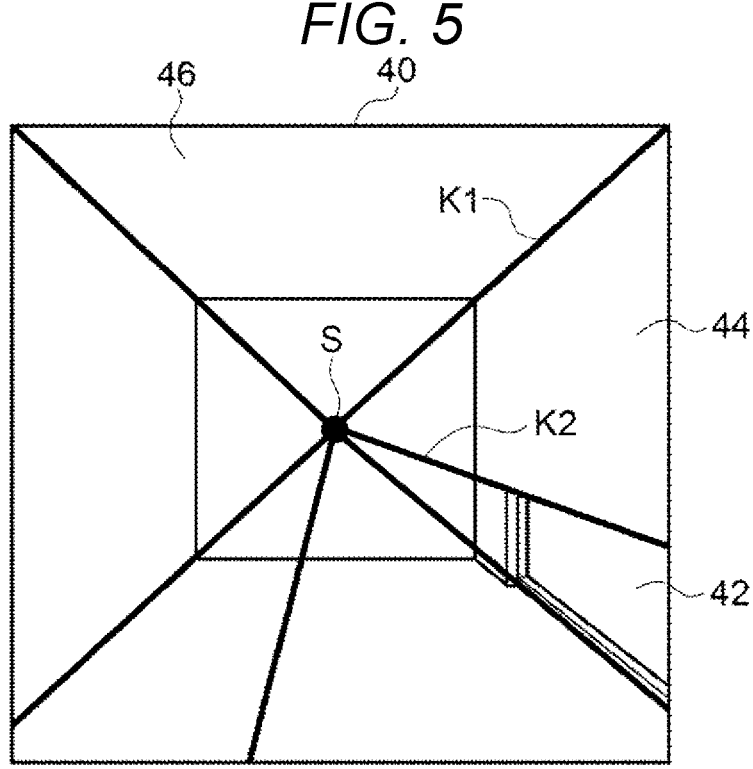
FIG. 5 illustrates a vanishing point.
Figure 6:
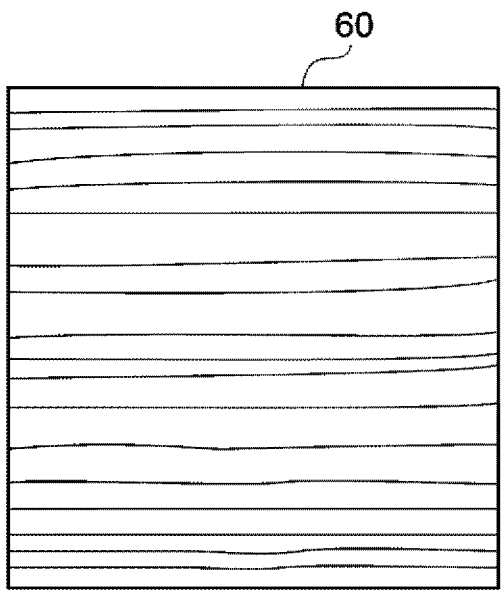
FIG. 6 illustrates an example of a sample image.

Here, in the present exemplary embodiment, what will be described is an example in which the original image 40 has a vanishing point S as illustrated in FIG. 5. The term "vanishing point" refers to a point at which plural lines that are in reality parallel to each other but are drawn non-parallel in a perspective drawing intersect each other. In the original image 40 having such a vanishing point, for example, a boundary line K1 between the wall 44 and a ceiling 46 and a boundary line K2 between the wall 44 and the window 42 are in reality parallel but are non-parallel in the original image 40. If the replacement target region 44 is replaced with a sample image 60 having wood grain extending in a lateral direction as illustrated in FIG. 6 as it is, the resultant composite image would be an image without perspective. Therefore, in the present exemplary embodiment, a projective transformation region is set, a projective transformation region image is generated by projectively transforming the sample image such that the transformed sample image has a shape of a projective transformation image, and the replacement target region 44 is replaced with the projective transformation image. It is noted that the projective transformation is an example of a geometrical transformation, that the projective transformation region is an example of a geometrical transformation region, and that the projective transformation image is an example of a geometrical transformation image.

Thus, in step S112, the CPU 31A sets the projective transformation region based on the replacement target region 44. Here, the projective transformation region is a region for use in generating the projective transformation image into which the sample image is projectively transformed.

Specifically, the CPU 31A sets the projective transformation region by setting plural specific points for specifying the projective transformation region including the replacement target region 44, based on the shape of the replacement target region 44. The CPU 31A sets the plural specific points, for example, based on a positional relationship between a reference point of the mask image 50 and the replacement target region 44. The reference point of the mask image 50 is a point that can be regarded as the vanishing point of the original image 40. The reason why the reference point assumed to be the vanishing point of the original image 40 is set is that when the projective transformation region is set using the reference point which can be regarded as the vanishing point of the original image 40, the projective transformation image that is less likely to cause the user to feel uncomfortable can be obtained.

Figure 7:
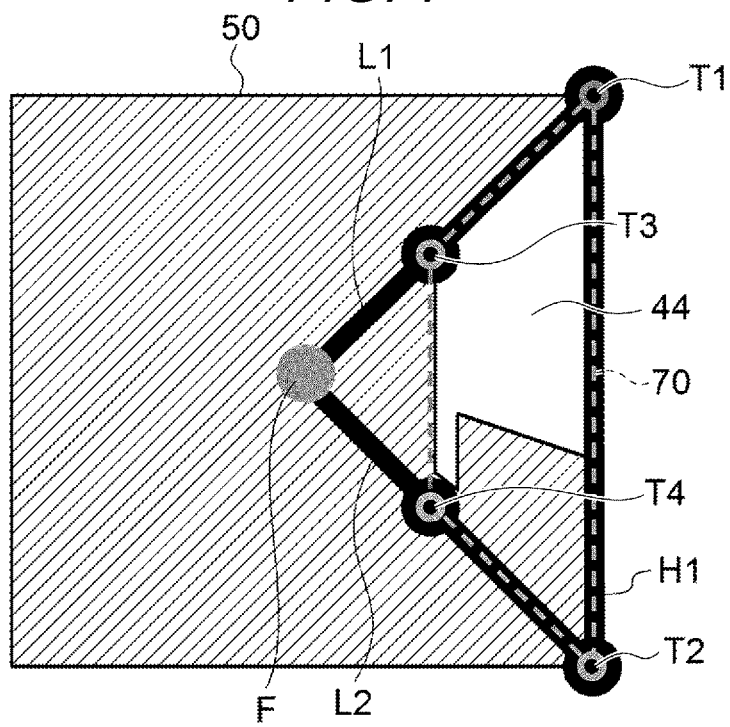
FIG. 7 illustrates setting of a projective transformation region.

In the present exemplary embodiment, what will be described is an example in which a center point of the mask image 50 is set as a reference point F as illustrated in FIG. 7. It is noted that the position of the reference point F is not limited to the center point.

Figure 8:
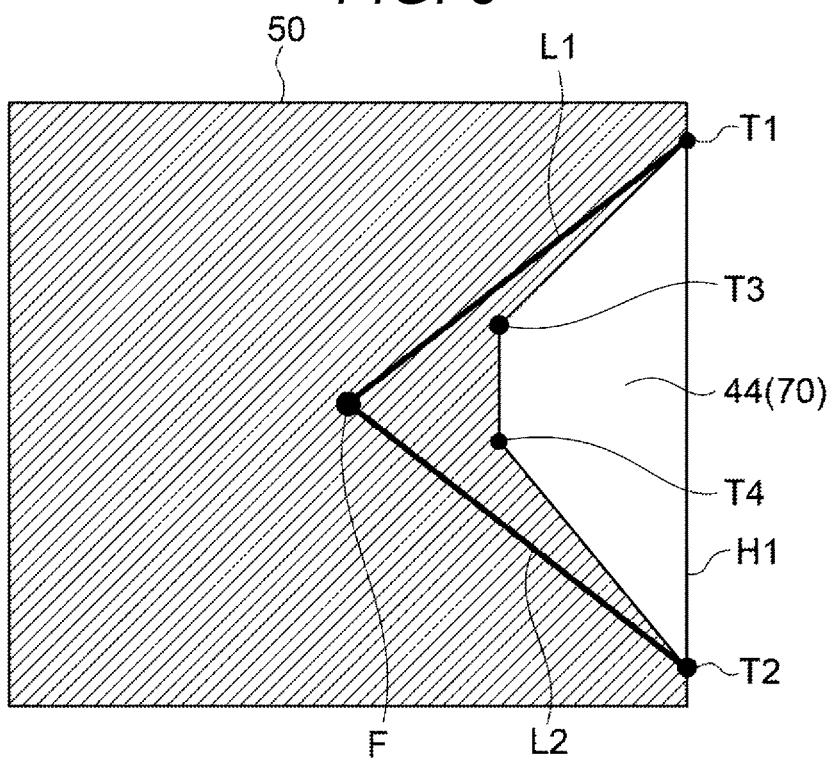
FIG. 8 illustrates the setting of the projective transformation region.

For simplicity of description, a replacement target region having a simple shape will be described below. As illustrated in FIG. 8, the CPU 31A specifies the following straight lines L1 and L2. That is, the straight lines L1 and L2 extend from the reference point F toward the outer edge of the mask image 50 and contact the replacement target region 44 from the outside, that is, the straight lines L1 and L2 circumscribe the replacement target region 44. Then, the CPU 31A sets intersections point between (i) the straight lines L1 and L2 and (ii) a side H1 of the mask image 50 (specifically, the right side in the example of FIG. 8) as specific points T1 and T2, respectively. Next, the CPU 31A sets the following points as specific points. That is, the points are on the outer edge of the replacement target region 44, and a closed region obtained by connecting the points and the specific points T1 and T2 with straight lines includes the replacement target region 44. In the example of FIG. 7, the replacement target region 44 has a shape obtained by rotating a trapezoid by 90 degrees, and both ends of the upper side of the trapezoid are specific points T3 and T4.

In the example of FIG. 8, a trapezoidal region obtained by connecting the specific points T1 to T4 with straight lines is a projective transformation region 70. It is noted that, in the example of FIG. 8, the replacement target region 44 coincides with the projective transformation region 70.

In the example illustrated in FIG. 7, a trapezoidal region obtained by connecting the specific points T1 to T4 with the straight lines is also the projective transformation region 70. It is noted that, in the example of FIG. 7, the projective transformation region 70 is set so as to include the replacement target region 44.

In step S114, the CPU 31A receives selection of a sample image. The user refers to the menus screen, operates the operation unit 32, and selects from the menu screen a sample image with which the user wants to replace the designation region designated in step S106. The storage 35 stores, as the sample image database 35C, image data of sample images such as various wallpapers and floorings in advance. The sizes of the sample images in the present exemplary embodiment are, for example, the same as those of the original image 40 and the mask image 50.

Upon receipt of the selection of the sample image, the CPU 31A proceeds to step S116. On the other hand, if the CPU 31A does not receive the selection of the sample image, the CPU 31A waits until receiving the selection of the sample image.

Figure 9:
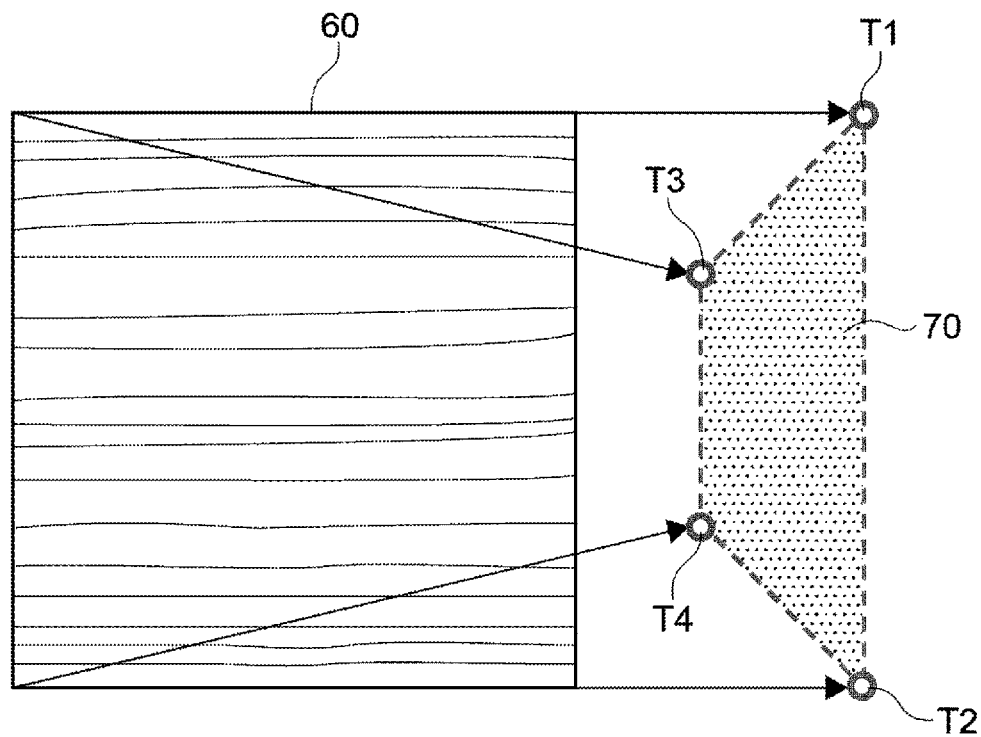
FIG. 9 illustrates an example in which the sample image is transformed to have a shape of the projective transformation region.
Figure 10:
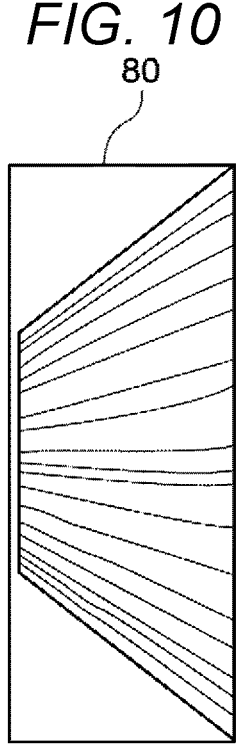
FIG. 10 illustrating an example of a projective transformation image.

In step S116, the CPU 31A acquires the selected sample image by reading the selected sample image from the sample image database 35C of the storage 35. Then, as illustrated in FIG. 9, the CPU 31A projectively transforms the acquired sample image 60 to the projective transformation region 70. This generates a projective transformation image 80 as illustrated in FIG. 10.

Figure 11:
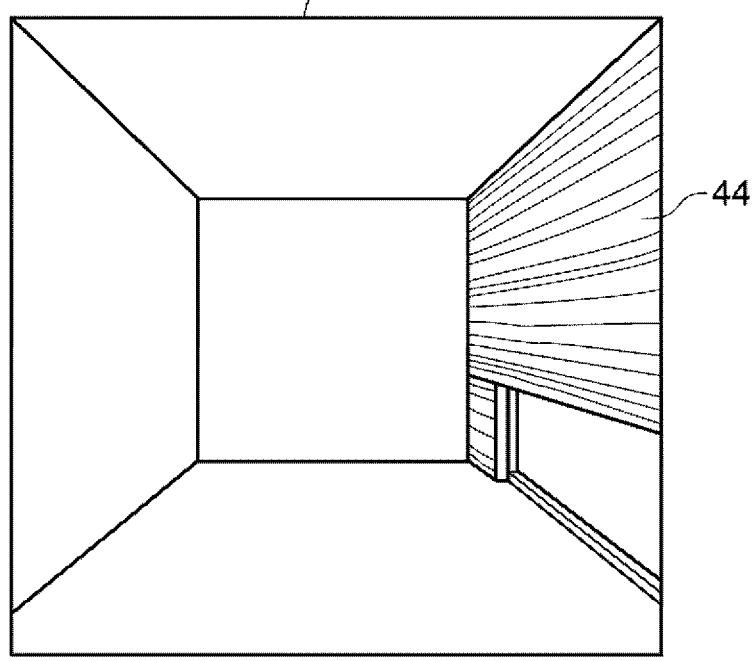
FIG. 11 illustrates an example of a composite image after projective transformation.

In step S118, the CPU 31A generates a composite image in which the replacement target region 44 is replaced using the projective transformation image 80 and causes the display 33 to display the composite image. Specifically, the CPU 31A calculates a logical product of each pixel of the mask image 50 and a respective one of the pixels of the projective transformation image 80, to generate a replacement image. Then, the CPU 31A replaces the replacement target region 44 of the original image 40 with the generated replacement image. Accordingly, as illustrated in FIG. 11, obtained is a composite image 40A in which the right wall is replaced with the projective transformation image 80 into which the sample image 60 is projectively transformed. Since the CPU 31A performs the replacement operation using the projective transformation image 80 obtained by the projective transformation, the obtained composite image 40A is less likely to cause the user to feel uncomfortable.

If the user views the composite image 40A displayed on the display 33 and wants to change the sample image, the user may instruct the change of the sample image by operating the operation unit 32.

Thus, in step S120, the CPU 31A determines whether it has been instructed to change the sample image. If it has been instructed to change the sample image, the CPU 31A proceeds to step S114. On the other hand, if it has not been instructed to change the sample image, the CPU 31A proceeds to step S122.

If the user wants to change the replacement target region, the user may operate the operation unit 32 to instruct the change of the replacement target region.

Thus, in step S122, the CPU 31A determines whether it has been instructed to change the replacement target region. If it has been instructed to change the replacement target region, the CPU 31A proceeds to step S106. On the other hand, if it has not been instructed to change the replacement target region, the CPU 31A proceeds to step S124.

If the user wants to change the interior image to be viewed, the user may instruct the change of the interior image by operating the operation unit 32.

Thus, in step S124, the CPU 31A determines whether it has been instructed to change the interior image. If it has been instructed to change the interior image, the CPU 31A proceeds to step S102. On the other hand, if it has not been instructed to change the interior image, the CPU 31A proceeds to step S126.

In step S126, the CPU 31A determines whether it has been instructed to end the information processing. If it has not been instructed to end the information processing, the CPU 31A proceeds to step S120; otherwise, the CPU 31A ends the routine.

Second Exemplary Embodiment

Next, a second exemplary embodiment will be described. The same reference numerals will be allocated to the same elements as those of the first exemplary embodiment, and detailed description thereof will be omitted. A configuration of an information processing apparatus 30 is the same as that of the first exemplary embodiment, and therefore description thereof will be omitted.

Figure 12:
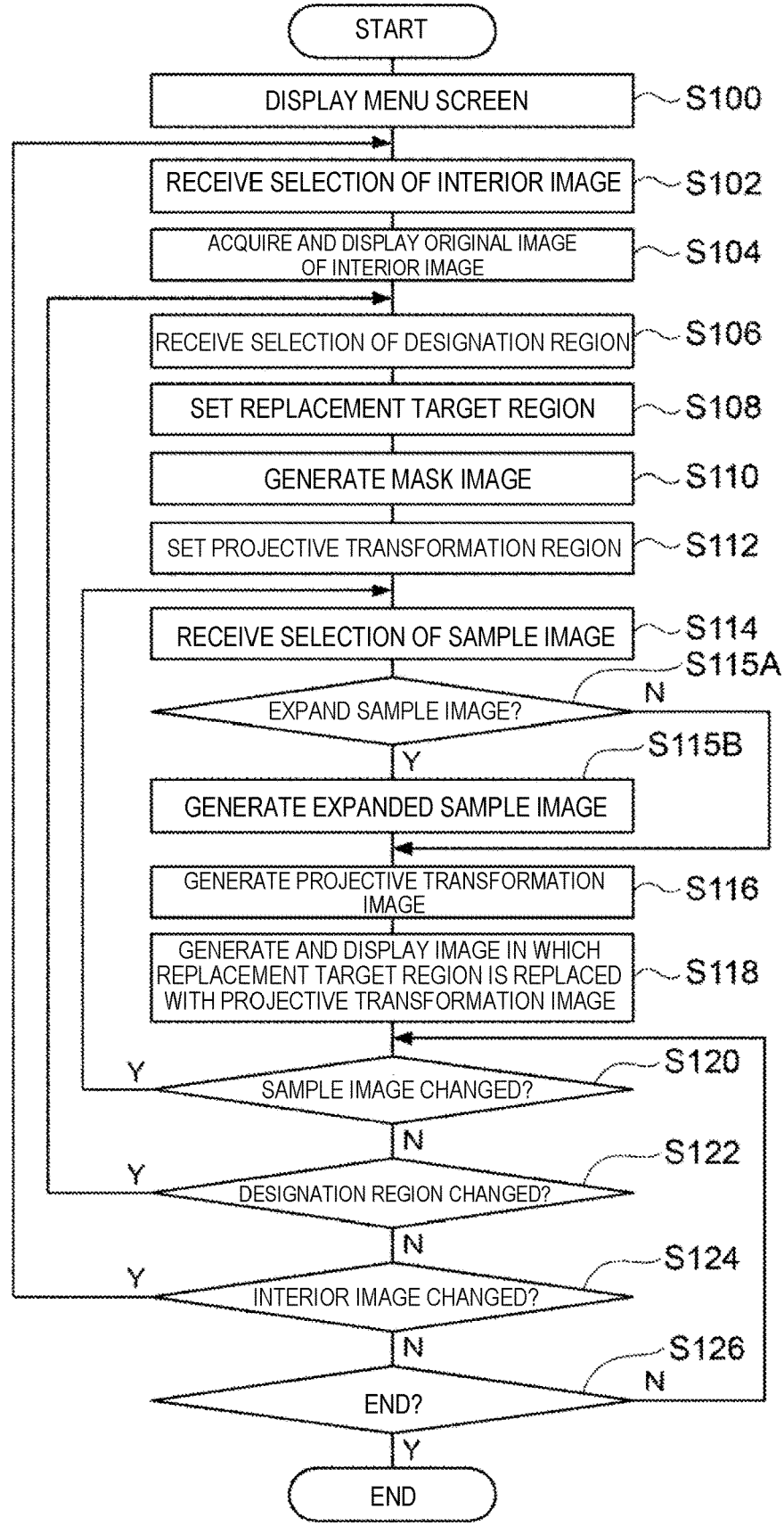
FIG. 12 is a flowchart of information processing according to a second exemplary embodiment.

FIG. 12 is a flowchart of information processing according to the second exemplary embodiment. The information processing illustrated in FIG. 12 is different from the information processing illustrated in FIG. 2 in that processes in steps S115A and S115B are added. Other processes are the same as those in the information processing in FIG. 2, and thus, description thereof will be omitted.

Figure 13:
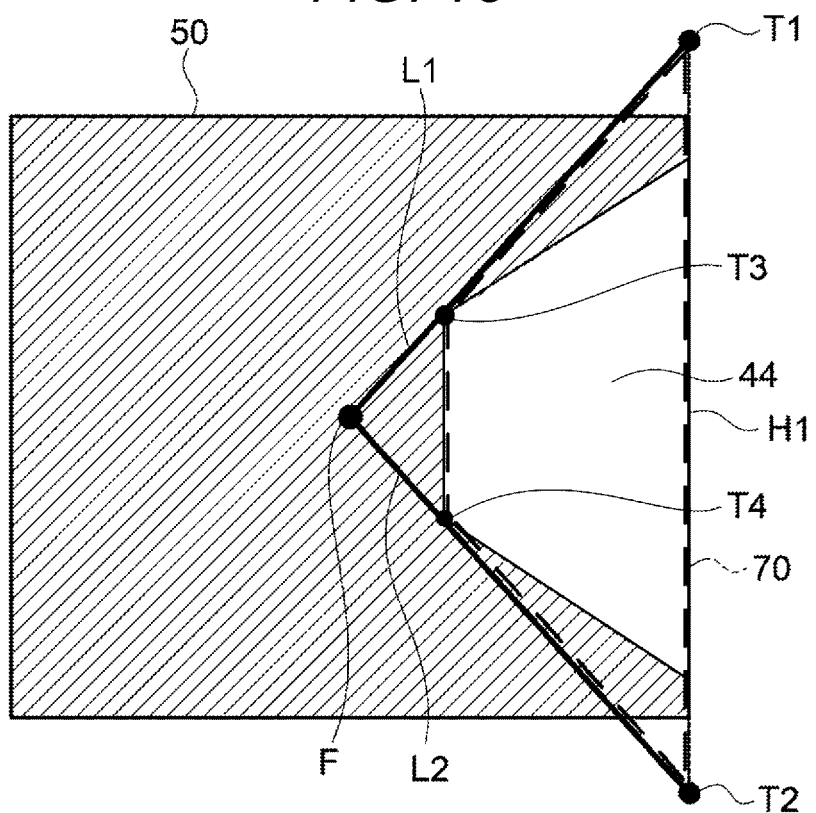
FIG. 13 illustrates expanding of a sample image.

In the example of FIG. 8 described in the first exemplary embodiment, the specific points T1 and T2 are present on the right side of the mask image 50. However, depending on the shape of the replacement target region 44, the positions of the specific points T1 and T2 may be on a line obtained by extending the side H1 of the mask image 50 as illustrated in FIG. 13.

In this case, a part of the projective transformation region 70 represented by the specific points T1 to T4 protrudes from the mask image 50. Thus, an expanded sample image is generated by expanding the sample image 60.

Thus, in step S115A, the CPU 31A determines whether it is necessary to generate an expanded sample image by expanding the sample image 60. That is, the CPU 31A determines whether a part of the projective transformation region 70 protrudes from the mask image 50. If determining that a part of the projective transformation region 70 protrudes from the mask image 50, the CPU 31A proceeds to step S115B. On the other hand, if determining that the projective transformation region 70 does not protrude from the mask image 50, the CPU 31A proceeds to step S116.

In step S115B, the CPU 31A generates the expanded sample image obtained by expanding the sample image 60 in accordance with the part of the projective transformation region 70 protruding from the mask image 50.

Figure 14:
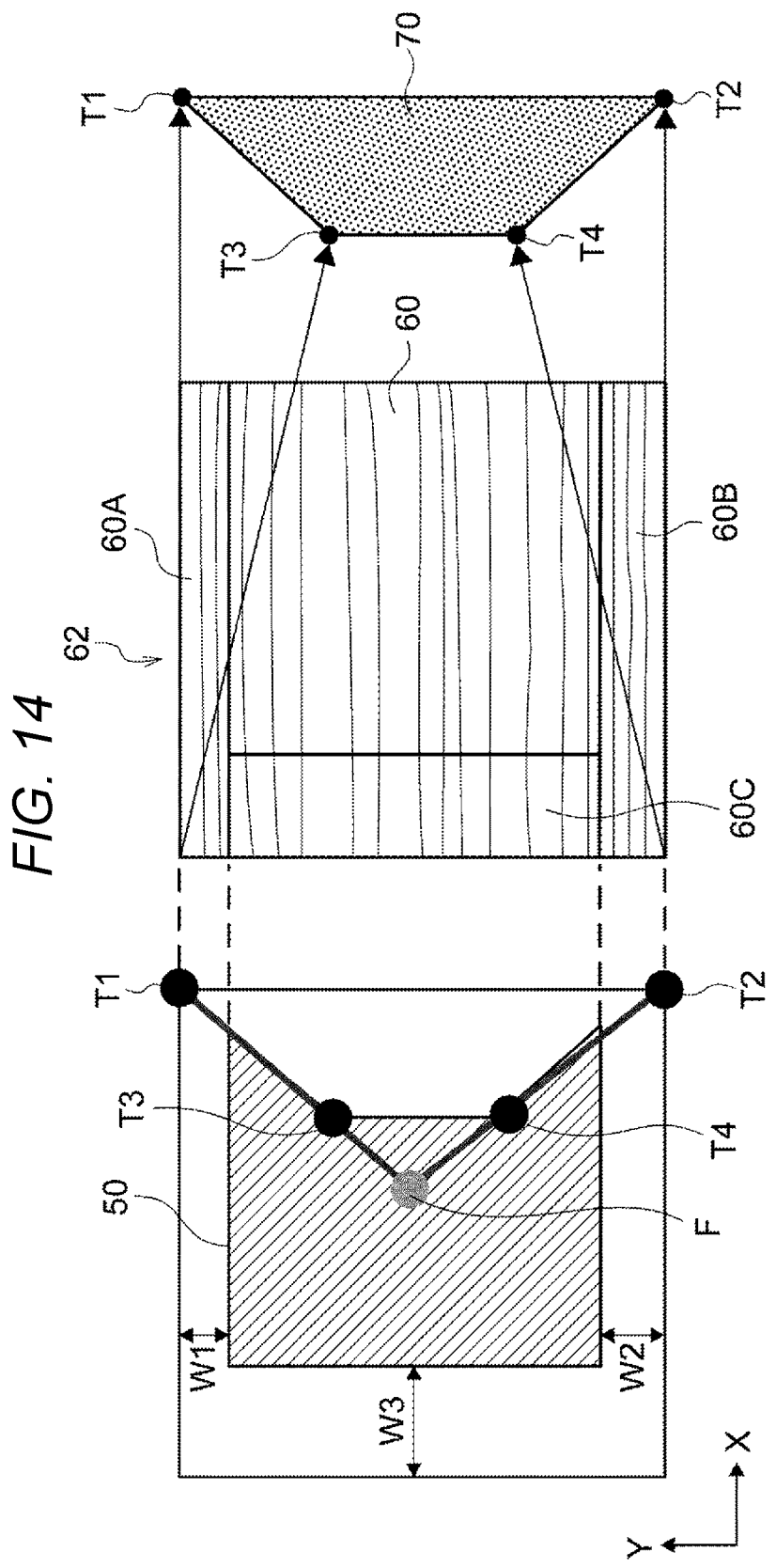
FIG. 14 illustrates the expanding of the sample image.

Specifically, as illustrated in FIG. 14, the CPU 31A adds an additional sample image 60A having a rectangle shape and having a width W1 by which the specific point T1 protrudes in the Y direction, to the upper side of the sample image 60. The CPU 31A adds an additional sample image 60B having a rectangle shape and having a width W2 by which the specific point T2 protrudes in the Y direction, to the lower side of the sample image 60. The CPU 31A calculates a width W3 by which the sample image 60 is to be extended in the X direction such that the expanded sample image has the same aspect ratio as the sample image 60, and adds an additional sample image 60C having a rectangle shape and having the calculated width W3 to the left side of the sample image 60. Accordingly, the CPU 31A generates an expanded sample image 62 by expanding the sample image 60 in accordance with the part of the projective transformation region 70 which protrudes from the mask image 50. The generated expanded sample image 62 is then projectively transformed to the projective transformation region 70.

The CPU 31A may generate the expanded sample image 62 by adding an image obtained by reversing a peripheral portion of the sample image 60, to the peripheral portion as an additional sample image. For example, the additional sample image 60A may be an image obtained by reversing an image along the upper side of the sample image 60. Similarly, the additional sample image 60B may be an image obtained by reversing an image along the lower side of the sample image 60. The additional sample image 60C may be an image obtained by reversing an image along the left side of the sample image 60. This prevents patterns of boundary portions between the sample image 60 and the additional sample images 60A to 60C from being unnatural.

Third Exemplary Embodiment

Next, a third exemplary embodiment will be described. The same reference numerals will be allocated to the same elements as those of the above described exemplary embodiments, and detailed description thereof will be omitted. A configuration of an information processing apparatus 30 is the same as that of the first exemplary embodiment, and therefore description thereof will be omitted.

In the third exemplary embodiment, what will now be described is an example in which the reference point F is adjusted so as to approach the vanishing point of the original image 40 will be described.

Figure 15:
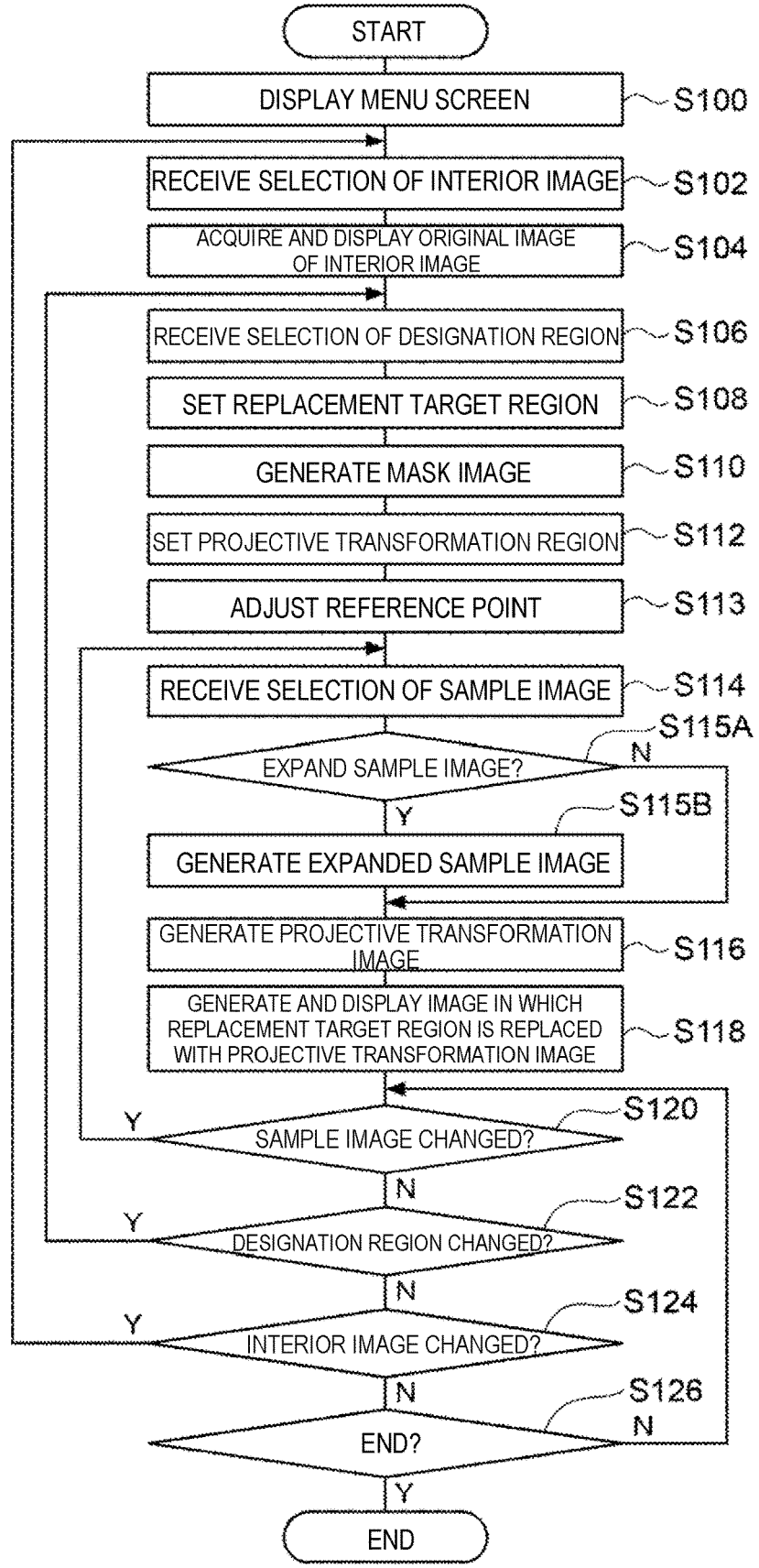
FIG. 15 is a flowchart of information processing according to a third exemplary embodiment.

FIG. 15 is a flowchart of information processing according to the third exemplary embodiment. The information processing illustrated in FIG. 15 is different from the information processing illustrated in FIG. 12 in that a process of step S113 is added. Other processes are the same as those of the information processing in FIG. 12, and thus, the description thereof will be omitted.

In step S113, the CPU 31A adjusts the projective transformation region 70 by adjusting the position of the reference point F such that the reference point F approaches the vanishing point of the original image 40.

Specifically, the CPU 31A adjusts the position of the reference point F such that an angle of view defined by two straight lines each of which connects the reference point F and a respective one of two specific points of the plural specific points is a maximum.

What will be described below is an example in which the projective transformation region set by executing the process in step S112 is a projective transformation region 70 illustrated in FIG. 16. In this example, as illustrated in FIG. 17, the CPU 31A moves the reference point F in the Y direction to newly specify specific points T1 to T4, and updates the straight lines L1 and L2. Then, the CPU 31A searches for a position at which an angle of view θ defined by the new reference point F and the straight lines L1 and L2 is a maximum angle of view and sets the found position as a reference point F1 after adjustment.

Figure 16:
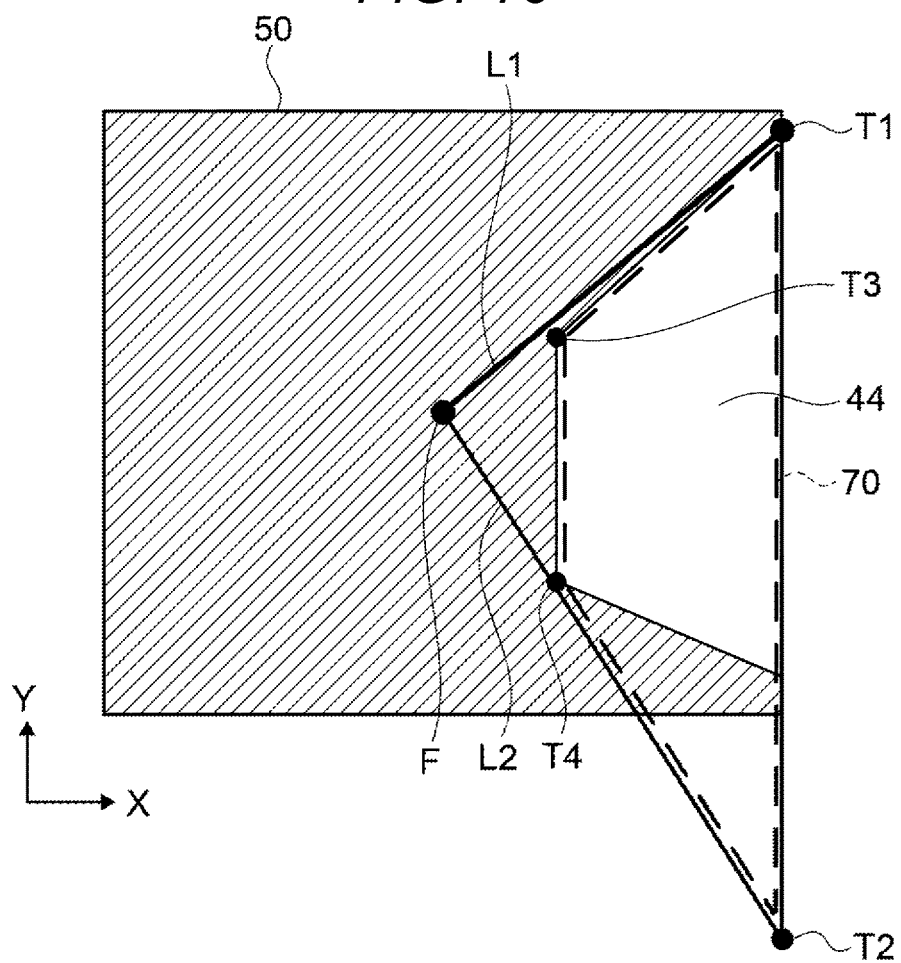
FIG. 16 illustrates moving of a vanishing point.
Figure 17:
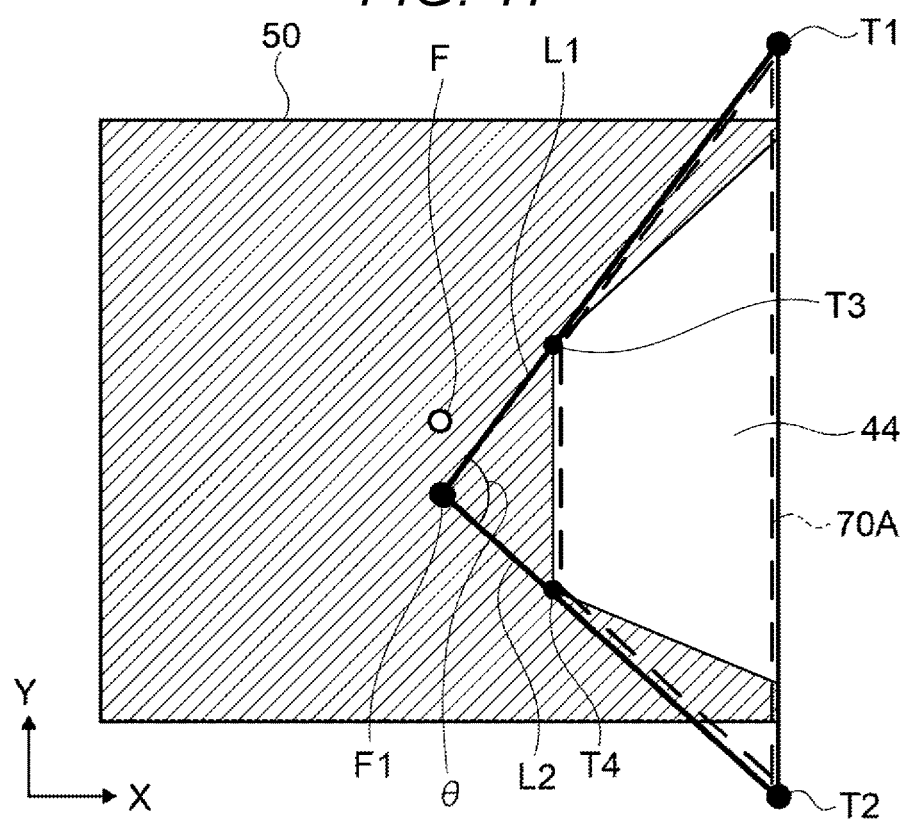
FIG. 17 illustrates the moving of the vanishing point.

Comparison between the shape of the projective transformation region 70 illustrated in FIG. 16 and a shape of a projective transformation region 70A illustrated in FIG. 17 shows that the shape of the projective transformation region 70A illustrated in FIG. 17 is more similar to the shape of the replacement target region 44. That is, the reference point F1 is closer to the vanishing point than the reference point F. Thus, by adjusting the position of the reference point F such that the angle of view θ defined by the reference point F and the straight lines L1 and L2 is the maximum angle of view, the shape of the projective transformation region 70 becomes more similar to the shape of the replacement target region 44.

The CPU 31A may adjust the position of the reference point F using a degree of coincidence between the replacement target region 44 and the projective transformation region 70. Specifically, the CPU 31A moves the position of the reference point F in the Y direction, newly specifies the specific points T1 to T4, and updates the straight line L1 and L2, to thereby update the projective transformation region 70. Then, the CPU 31A calculates the degree of coincidence between the replacement target region 44 and the new projective transformation region 70. The degree of coincidence may be, for example, a similarity between the shape of the replacement target region 44 and the shape of the projective transformation region 70.

Until the calculated degree of coincidence meets a predetermined condition, the CPU 31A may repeatedly move the reference point F in the Y direction and execute the same process. The predetermined condition may be (i) a condition that the calculated degree of coincidence is equal to or more than a predetermined threshold or (ii) a condition that the number of times the reference point F is moved is equal to or more than a predetermined value. The CPU 31A adjusts the position of the reference point F using the degree of coincidence between the replacement target region 44 and the projective transformation region 70 in the above described manner, so that the reference point F approaches the vanishing point.

The CPU 31A may move the reference point F using binary search. For example, the CPU 31A obtains an intersection point between a straight line connecting the specific points T1 and T2 and a line that passes through the reference point F and is perpendicular to the line connecting the specific points T1 and T2. Then, the CPU 31A obtains a bisection point that bisects a distance between the obtained intersection point and the specific point T1, and sets a point having the same Y coordinate as the bisection point has, as a new reference point F. When the reference point F is not determined even though the reference point F has been moved in the Y direction from the obtained intersection point to the specific point T1, the CPU 31A performs the same process while moving the reference point F in the Y direction from the obtained intersection point to the specific point T2.

The CPU 31A may move the reference point F not only in the Y direction but also in the X direction to search for a point where the angle of view θ is the maximum angle of view, and set the found point as the reference point F1 after adjustment. Accordingly, the reference point F further approaches the vanishing point.

When the CPU 31A can acquire not only the original image 40 in the XY plane, but also an original image in the YZ plane and an original image in the ZX plane, the CPU 31A may move the reference point F in the Y direction for the original image 40 in the XY plane, move the reference point F in the Z direction for the original image in the YZ plane, and move the reference point F in the X direction for the original image in the ZX plane, so that the CPU 31A can adjust the position of the reference point F three dimensionally. Accordingly, the reference point F further approaches the vanishing point.

Fourth Exemplary Embodiment

Next, a fourth exemplary embodiment will be described. The same reference numerals will be allocated to the same elements as those of the above described exemplary embodiments, and detailed description thereof will be omitted. A configuration of an information processing apparatus 30 is the same as that of the first exemplary embodiment, and therefore description thereof will be omitted.

Figure 18:
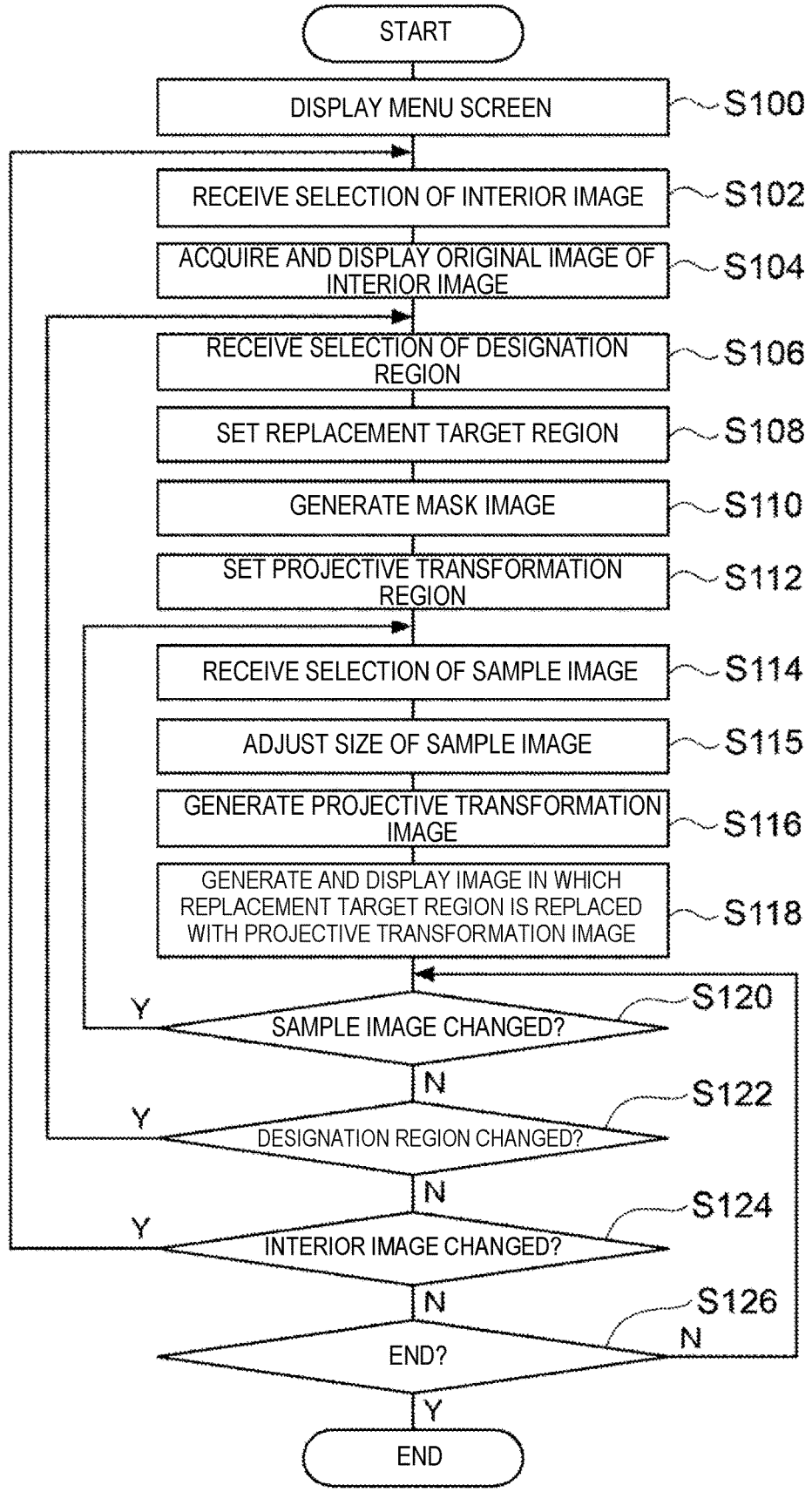
FIG. 18 is a flowchart of information processing according to a fourth exemplary embodiment.

FIG. 18 is a flowchart of information processing according to the fourth exemplary embodiment. The information processing illustrated in FIG. 18 is different from the information processing illustrated in FIG. 2 in that a process of step S115 is added. Other processes are the same as those in the information processing in FIG. 2, and thus, description thereof will be omitted.

In step S115, the CPU 31A adjusts the size of the sample image 60 in accordance with the size of the projective transformation region 70. For example, if the projective transformation region 70 has a relatively elongated shape that extends vertically as illustrated in FIG. 19, the CPU 31A projectively transforms the sample image 60 to the projective transformation region 70 using a sample image 60T obtained by correcting the sample image 60 to elongate vertically. Thus, the composite image after the replacement target region 44 is replaced is more natural.

Specifically, as illustrated in FIG. 20, the CPU 31A determines correction factors in the X direction and Y direction for use in correcting the sample image 60, based on (i) the angle of view θ defined by the reference point F and the straight lines L1 and L2 and (ii) a distance D in the X direction from the reference point F to the projective transformation region 70, and generates the sample image 60T by correcting the sample image 60 based on the determined correction factors.

For example, if the angle of view θ is the right angle (that is, 90 degrees), the CPU 31A sets the correction factors in the X direction and Y direction to "1.0". As the angle of view θ increases, the CPU 31A increases the correction factor in the Y direction, and as the angle of view θ decreases, the CPU 31A decreases the correction factor in the Y direction.

As the distance D from the reference point F to the projective transformation region 70 increases, the CPU 31A decreases the correction factor in the X direction, and as the distance D decreases, the CPU 31A increases the correction factor in the X direction.

Then, the CPU 31A generates the sample image 60T by correcting the sample image 60 such that a length of the sample image 60 in the X direction corresponds to the correction factor in the X direction and a length of the sample image 60 in the Y direction corresponds to the correction factor in the Y direction. Accordingly, the CPU 31A obtains the sample image 60T corresponding to the size of the projective transformation region 70.

Then, in step S116, the CPU 31A projectively transforms the sample image 60T having the corrected size to the projective transformation region 70. Thus, the composite image after the replacement target region 44 is replaced is more natural.

The present disclosure has been described above using the exemplary embodiments. It is noted that the present disclosure is not limited to the scope described in the exemplary embodiments. Various modifications and improvements may be made to the exemplary embodiments without departing from the spirit of the present disclosure. The modified or improved exemplary embodiments are also included in the technical scope of the present disclosure.

For example, in the exemplary embodiments, the projective transformation is used as a geometrical transformation. Alternatively, other transformations, such as affine transformation, rather than projective transformation, may be used.

In the exemplary embodiments, the information processing program 35A is installed in the storage 35. It is noted that the present disclosure is not limited to this configuration. The information processing program 35A according to the exemplary embodiments may be provided in a form that the information processing program 35A is stored in a computer readable storage medium. For example, the information processing program 35A according to the present exemplary embodiments may be provided in a form that the information processing program 35A is recorded on an optical disc (such as a Compact Disc ROM (CD-ROM) and a Digital Versatile Disc ROM (DVD-ROM)) or in a form that the information processing program 35A is recorded in a semiconductor memory (such as a Universal Serial Bus (USB) memory and a memory card). The information processing program 35A according to the exemplary embodiments may be acquired from an external device over a communication line connected to the communication unit 34.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
  set a geometrical transformation region for use in generating a geometrical transformation image into which a sample image is geometrically transformed, based on a replacement target region set in a part of an original image;
  generate the geometrical transformation image by geometrically transforming the sample image such that the transformed sample image has a shape of the geometrical transformation region;
  replace the replacement target region using the geometrical transformation image;
  set the geometrical transformation region by setting a plurality of specific points for specifying the geometrical transformation region including the replacement target region based on a shape of the replacement target region;
  acquire a mask image in which the replacement target region and a region other than the replacement target region are represented by binary values, the mask image having the same size as the original image; and
  set the plurality of specific points based on a positional relationship between a reference point of the mask image and the replacement target region.

2. The information processing apparatus of claim 1, wherein
the processor is configured to, when a part of the geometrical transformation region represented by the plurality of specific points protrudes from the mask image, geometrically transform an expanded sample image such that the transformed expanded sample image has the shape of the geometrical transformation region, wherein the expanded sample image is obtained by expanding the sample image in accordance with the part of the geometrical transformation region protruding from the mask image.

3. The information processing apparatus of claim 2, wherein the expanded sample image is generated by adding an image obtained by reversing an image of a peripheral portion of the sample image to the peripheral portion as an additional sample image.

4. The information processing apparatus according to claim 3, wherein
the processor is configured to set the plurality of specific points based on the positional relationship between the reference point and the replacement target region using a center point of the mask image as the reference point.

5. The information processing apparatus according to claim 3, wherein
the processor is configured to adjust a position of the reference point such that an angle of view defined by two straight lines each of which connects the reference point and a respective one of two specific points of the plurality of specific points is a maximum.

6. The information processing apparatus of claim 5, wherein
the processor is configured to adjust the position of the reference point using a degree of coincidence between the replacement target region and the geometrical transformation region.

7. The information processing apparatus according to claim 2, wherein
the processor is configured to set the plurality of specific points based on the positional relationship between the reference point and the replacement target region using a center point of the mask image as the reference point.

8. The information processing apparatus according to claim 2, wherein
the processor is configured to adjust a position of the reference point such that an angle of view defined by two straight lines each of which connects the reference point and a respective one of two specific points of the plurality of specific points is a maximum.

9. The information processing apparatus of claim 8, wherein
the processor is configured to adjust the position of the reference point using a degree of coincidence between the replacement target region and the geometrical transformation region.

10. The information processing apparatus according to claim 2, wherein
the processor is configured to adjust a size of the sample image in accordance with a size of the geometrical transformation region.

11. The information processing apparatus according to claim 1, wherein
the processor is configured to set the plurality of specific points based on the positional relationship between the reference point and the replacement target region using a center point of the mask image as the reference point.

12. The information processing apparatus according to claim 1, wherein
the processor is configured to adjust a position of the reference point such that an angle of view defined by two straight lines each of which connects the reference point and a respective one of two specific points of the plurality of specific points is a maximum.

13. The information processing apparatus of claim 12, wherein
the processor is configured to adjust the position of the reference point using a degree of coincidence between the replacement target region and the geometrical transformation region.

14. The information processing apparatus according to claim 1, wherein
the processor is configured to adjust a size of the sample image in accordance with a size of the geometrical transformation region.

15. The information processing apparatus according to claim 1, wherein
the processor is configured to:
receive a selection of the original image;
receive a selection of the sample image; and
display an image in which the replacement target region is replaced using the geometrical transformation image.

16. A non-transitory computer readable medium storing a program that causes a computer to execute information processing, the information processing comprising:
setting a geometrical transformation region for use in generating a geometrical transformation image into which a sample image is geometrically transformed, based on a replacement target region set in a part of an original image;
generating the geometrical transformation image by geometrically transforming the sample image such that the transformed sample image has a shape of the geometrical transformation region;
replacing the replacement target region using the geometrical transformation image;
setting the geometrical transformation region by setting a plurality of specific points for specifying the geometrical transformation region including the replacement target region based on a shape of the replacement target region;
acquiring a mask image in which the replacement target region and a region other than the replacement target region are represented by binary values, the mask image having the same size as the original image; and
setting the plurality of specific points based on a positional relationship between a reference point of the mask image and the replacement target region.

* * * * *